May 25, 1954  R. D. WAITE  2,679,164
VARIABLE DRIVE MECHANISM FOR GAUGES
Filed Sept. 12, 1949  2 Sheets-Sheet 1
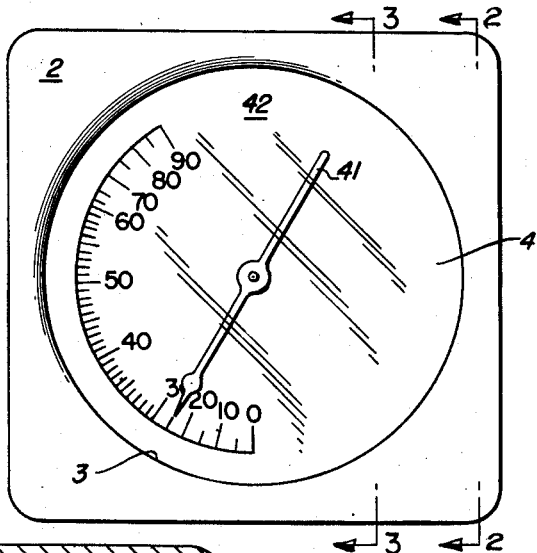
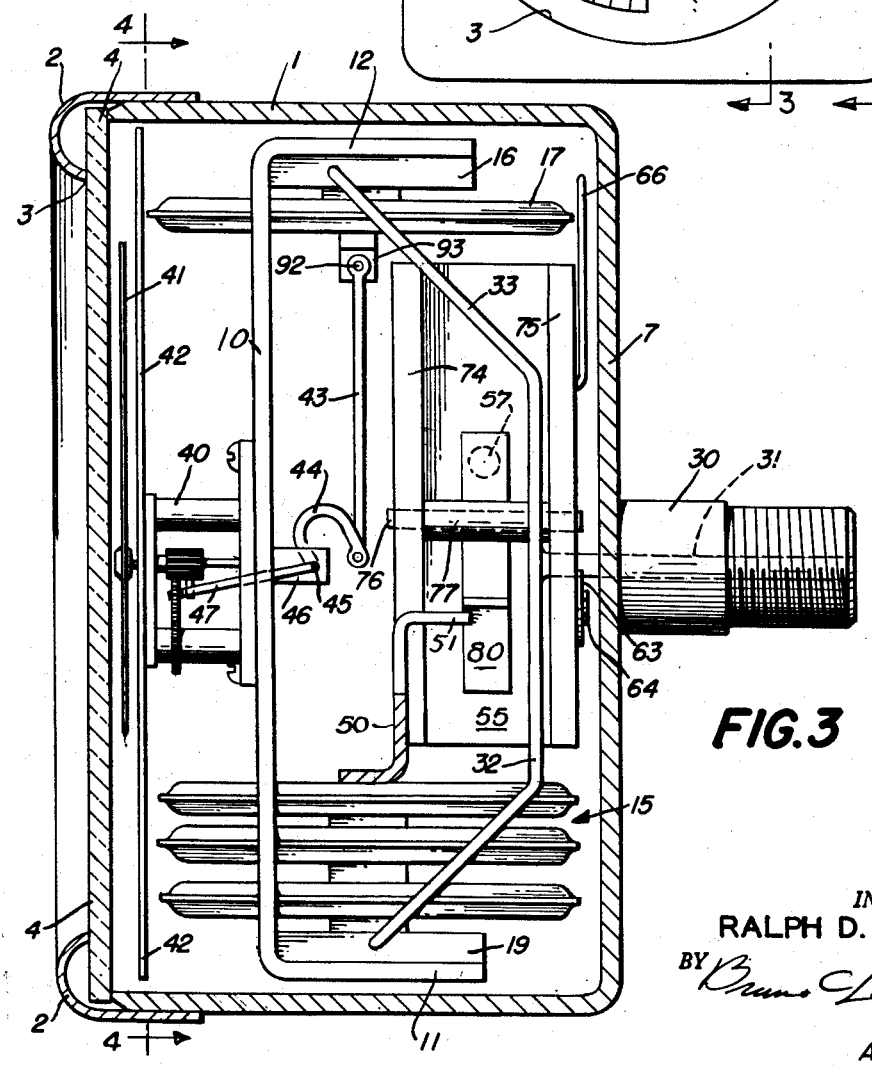
INVENTOR.
RALPH D. WAITE
BY
ATTORNEY May 25, 1954  R. D. WAITE  2,679,164
VARIABLE DRIVE MECHANISM FOR GAUGES
Filed Sept. 12, 1949  2 Sheets-Sheet 2

INVENTOR.
RALPH D. WAITE
BY
ATTORNEY

Patented May 25, 1954

2,679,164

UNITED STATES PATENT OFFICE 2,679,164

VARIABLE DRIVE MECHANISM FOR GAUGES

Ralph D. Waite, Sellersville, Pa., assignor to American Machine and Metals, Inc., New York, N. Y., a corporation of Delaware Application September 12, 1949, Serial No. 115,155

9 Claims. (Cl. 73—397)

This invention relates to gauges and particularly to a means permitting the pointer of a pressure gauge to move through a larger increment for a given pressure change if that change takes place while the total pressure is between certain limits than it would have moved if that pressure change had taken place when the total pressure was either above or below those limits.

While the invention is applicable to any pressure gauge, it is illustrated as applied to a mechanism which is designed to close a circuit when the pressure reaches an upper or a lower limit. By use of the invention, the observer can note the pressure regardless of whether it falls within the range where the expanded instrument takes place, and still have the convenience of reading the scale more easily if the pressure is in that range within which he ordinarily wishes to set the limits at which one or the other switch is closed. The switches involved can be employed to control alarm circuits. The pressure measured may be pressure created in a sealed fluid due to temperature changes.

One object of the invention is to provide a compact, simple, rugged and readily adjusted alarm gauge of the type described.

Another object of the invention is to provide an improved retard mechanism which will permit wide spaces of the division over that part of the scale covered by the pointer, while the pressure is within the range to be covered by the upper and the lower limit alarms, but narrower divisions in those portions of the scale falling below and above that range.

In one aspect of the invention the retard mechanism includes an element movable by the measured variable, said element also moving a cantilever spring, the spring being mounted on a pivoted carrier.

Another object is to provide a retarting mechanism which can readily be adjusted after assembly to make the point of incidence of the retarding mechanism agree with the point where the scale spacing changes.

Another object is to provide ready means for varying the amount of retardation when the mechanism is effective to agree with the changed scale of the divisions beyond the retard point.

Fig. 1 is a top view of a gauge embodying the invention.

Fig. 3 shows a vertical section drawn to an enlarged scale along line 3—3 in Fig. 1.

Figure 2:
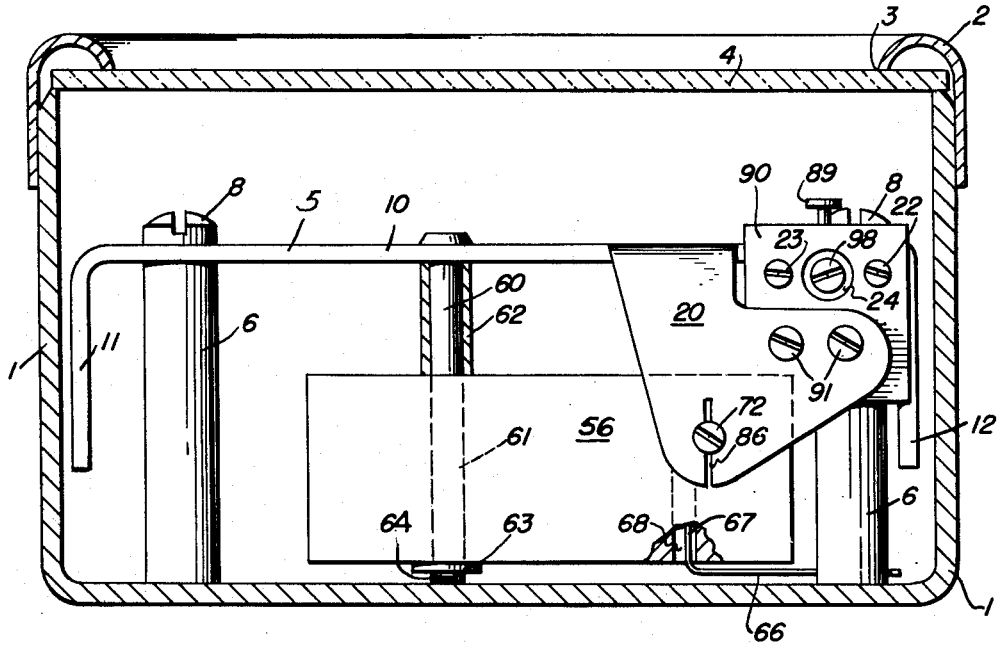
Fig. 2 is a vertical section drawn to an enlarged scale taken along the line 2—2 of Fig. 1, with diaphragms and associated parts deleted.

In the gauge shown in the drawings, 1 represents the body of the housing and 2 the top ring of the gauge. The top ring has a circular central opening 3. A glass plate 4 is supported on the upper end of the housing 1 below the central opening.

Supported on the back plate 7 of the housing are posts 6 (Fig. 2). These posts carry a mounting plate 5, to which all of the operating parts of the mechanism are secured. Screws 8 pass through holes in the mounting plate into tapped holes on the top of the posts to hold the mounting plate 5 securely in place. The posts 6 are rivited or welded to the back 7 of the housing. The mounting plate is a single stamping which has a table-like surface 10 having down-turned flanges on all four of its sides. The two down-turned flanges 11 and 12 at opposite ends of the plate support the bellows, also referred to as diaphragms.

One of the objects of the invention being to support all of the parts in rigid relation to each other, the diaphragms are brought as close as possible to the back 10 of the mounting plate by cutting away parts of the mounting plate so that the axis of the bellows which are shown in Fig. 3 may be brought closer to the back of the plate.

One set of bellows, 15, is supported on a base 19 attached to the flange 11 of the mounting plate. This diaphragm, in a manner to be described below, actuates both the switches which may give an alarm at the upper and lower limits of pressure or temperature. The other diaphragm 17 is mounted on a base 16, which is rigidly attached to the flange 12 of the mounting plate. This actuates the pointer indicating the pressure at any instant.

The two remaining sides of the plate 5 are down-turned to form flanges 18 and 20 (Fig. 2). Each of these flanges supports one of the adjusting screws 72. These screws permit adjusting these switches which give the alarm at the desired pressures in a manner to be described below. The down-turned flange 20 also supports a U-shaped housing 90 (Fig. 2) which is attached to the flange by screws 91. This housing supports a retard mechanism to be described later. The entire housing 1 is supported on the threaded stem 30 which is attached to a piping system. A hole 31 is drilled through the stem 30. This hole connects with tubes 32, 33 which connect with the bases 16 and 19 of the two bellows. In this manner the pressure in the system to which the gauge is connected is transmitted equally to both bellows.

Diaphragm 17 actuates a conventional type of gauge pointer actuating mechanism 40 supported on the top of the mounting plate by screws tapped into the mounting plate 5. This mechanism sits over an opening in the mounting plate and has ears 46 projecting down through this opening. The actuating mechanism 40 carries a pointer 41 which cooperates with the dial 42 carried by the gauge indicating mechanism 40.

It is convenient to have a scale which has a range considerably wider than the range within which pressure is to be held and still have the working range cover the major part of the scale. Thus, in the example here used and shown in Fig. 1, the normal operation pressure will fall between 30 and 60 lbs. and it is intended to set the alarm gauge to signal the upper and lower limits of some range which falls within that range. Since the alarm gauge does not automatically control the pressure source, it is desirable to be able to read, even though with less accuracy, the level to which the pressure falls or rises after giving the alarm. Thus, in the example given, the gauge may be set to give an alarm when the pressure falls to 35# or when it rises to 55#. It will be convenient to know, after the gauge drops past 35#, whether or not it drops to the value indicated, 25#, or to some other lower value. Motion is transmitted from the diaphragm 17 to the actuating mechanism 40 in any convenient manner, such as by a rod 43, one end of which is connected by a pin 92 to the ears 93 of a casting carried by the diaphragm while the other end is connected to a pitman 44. This pitman 44 is attached to a shaft 45 carried by the ears 46 of the indicating mechanism 40 previously referred to. The shaft 45 carries an arm 47 that extends upward through an opening in the mounting plate and actuates the mechanism which moves the pointer 41. The mechanism is so calibrated that when the pointer 41 is in the range between 30 and 60 lbs., the pointer will respond to the expansion or contraction of the bellows 17. A retarding mechanism to be described below inhibits the expansion or contraction of the bellows as the pointer passes the limits of the range 30 to 60 lbs. to give the contracted scale below and above the working range. By bringing the ends of the pitman 44 closer together or expanding them, the rate at which the pointer moves within the working range can be made to correspond to the pressure changes in the diaphragm.

The alarm mechanism includes two switches 55 and 56 (Figs. 2, 3). These switches may be of the precision type frequently referred to as "Microswitches." Such switches are generally mounted in a molded piece having two holes 61 and 68 (Fig. 2) extending through the molded piece. Normally the switch is rigidly attached to a support by screws or studs extending through these holes. In the present instance, however, each of the switches is mounted on a pin 60 which extends through one of the holes 61, leaving the switch housing free to pivot about that pin. The pin 60 is attached to a mounting plate by welding or in any other convenient manner. It extends down through the hole 61 in one of the switches. A spacer tube 62 may be used to support the switch a desired distance below the surface 10 of the mounting plate 5 and the washer 63 and cotter pin 64 in the end of the pin 60 prevent the switch from falling off the pin. A bent spring 66 has upturned ends 67. The upturned parallel ends 67 are normally further apart than the holes 68 so that the spring has to be sprung in place in assembly. Accordingly, the spring 66 tends to swing the free ends of the switch housings apart, away from each other, and each switch housing tends to be swung toward one of the down-turned flanges 18 or 20 (Fig. 4) of the mounting plate 5 which limits the motion.

Each of the downwardly turned flanges are drilled and tapped for an adjusting screw 72. Each of the flanges 18 and 20 may be slotted as shown at 86 so that the sides of the threaded hole will hold screw 72 in any adjusted position by friction. The outer casing has suitable openings near the ends of the screws 72 so that they may be moved with a screw driver and thus either or both of the switch housings may be swung about the pin 60 in order to change the pressure at which that switch will give its signal.

Each of the switches 55, 56 has a switch actuation pin 57 thrown outward by an internal spring. These switches are of the quick-break type, so that when the spring pin is pushed in gradually, the switch will remain in its outer position until the pin has built up a given pressure, after which the switch snaps sharply to its other position to make or to break the circuit without arcing. The diaphragm 15 which actuates both the upper and the lower pressure limit alarm switches 55 and 56 is entirely independent of the diaphragm 17 previously described. This diaphragm carries an axially extending plate 50 which has finger means 51, the ends of which are turned toward plate 7. Each switch carries a mechanism to be described by which one of the downturned fingers of plate 50 may actuate the switch pin of that switch.

The housing of the switch 55 has two horizontally extending flanges 75, 74. A pin 76 is rigidly fastened in the two flanges so as to support a sleeve 77 free to turn on the pin between the flanges. Attached to this sleeve 77 is arm 80 which extends into the path of finger 51.

The other switch 56 which gives the lower pressure alarm, has an arrangement generally similar to that of switch 55.

It will be seen that the diaphragm 15, in conjunction with the two switches 55 and 56, may be adjusted by turning the screws 72 from without the casing 1 so as to give the alarm signal for high pressure or low pressure at any desired point within the range of 30 and 60 lbs. on the scale.

Figure 4:
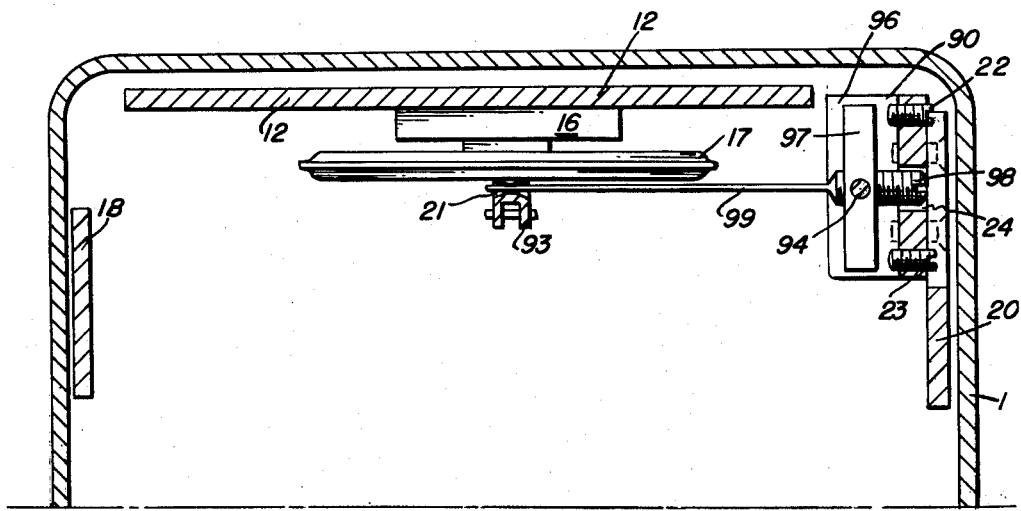
Fig. 4 is a half horizontal section taken along line 4—4 in Fig. 3, parts being omitted for purposes of clarity.

The retard mechanism which will cause the pointer to move at the slower rate below 30 lbs. and above 60 lbs. will now be described, the retard mechanism being the principal aspect of the invention. This retard mechanism is supported in the housing 90 (Figs. 2 and 4) which is rigidly attached to the downturned flange 20 of the mounting plate 5 in a manner already described. The retard mechanism consists of a piece of spring wire 99 passing through a hole 21 in the casting having the ears 93 referred to in the description of the pointer moving mechanism. The spring is attached to a manner to be described to a bar 97 which carries two conical depressions 94, one on the upper and one on the lower side. The bar is supported on two pivot screws 89, one extending down through the upper leg of the U-shaped housing 90, and the other extending upward through the lower leg 96 of the same housing. Within limits, this bar is free to rock about the vertical axis of pivot screw 89, and within these limits, the wire 99 imposes no restriction on the bellows 17. The housing 90 carries two screws 22, 23, which are not accessible from outside of the housing, but which can be adjusted before the mounting plate 5 and all of the attached mechanism has been placed in the outer housing. This permits factory adjustment limiting the angle through which the wire 99 can move before the bar 97 strikes one of the two screws 22, 23. It is intended to set these screws so that the bar 97 will touch screw 22 when the pointer reaches the lower limit of 30 lbs. of the working range. It is similarly intended to set the other screw 23 so that the bar 97 will touch it when the pointer reaches the upper limit of the working range of the alarm gauge, 60 lbs. in the example chosen. After the diaphragm 17 in expansion or contraction has reached the point where the bar 97 bears against one of the two screws 22, 23, it must not only move the pointer mechanism and overcome the hair spring in that mechanism, but it must also bend the spring wire 99 as shown in Fig. 4. This spring wire is so chosen that the additional resistance on the diaphragm will slow up this movement to conform to the scales 0–30 lbs. and 60–90 lbs. In order to permit adjustment to correct for variations in the quality of this spring wire or of the mechanism, the effective length of the spring wire 99 may vary. To permit this variation, the spring wire 99 is not mounted directly in the bar 97, but is attached to a screw 98. This screw is threaded in a hole in the bar 97, and the end of the screw is free to move within a hole 24 in the housing 90. This permits moving the end of wire 99 toward or from the hole 24, thus varying the effective length of the spring wire and thereby the amount of restraint which it imposes upon the diaphragm.

The operation of the alarm gauge and its adjustment will be evident from the preceding description.

In manufacture, all of the parts except the pointer are assembled on the mounting plate 5. The mounting plate is not placed in the casing until all of the adjustments have been made. These adjustments may be made in this manner:

A pressure of 30 lbs. is applied to tube 33. This will cause the indicating mechanism 40 to turn the spindle. The pointer 41 is now placed on the spindle so that it reads 30 lbs. The pressure in line 33 is now increased to 60 lbs. If the pointer does not read 60 lbs., the distance between the ends of the pitman 44 can be changed by using suitable tools.

While the pressure is still 60 lbs., the screw 23 is advanced so that it will just touch the bar 97. The pressure now may be dropped again to 30 lbs. and the screw 22 advanced until it will just touch bar 97.

It remains to adjust the retard mechanism for the scale portions 0–30 lbs. and 60–90 lbs. If the gauge is correct with a known pressure of 30 lbs. on line 33, it is only necessary to drop the pressure to 0. If the pointer 41 does not reach 0, the spring 99 has retarded too much. Greater flexibility is secured by making its effective length greater. To do this, turn the screw 98 outward. The effective length of the wire is that part which falls between the inner end of the screw 98 and the hole 21.

If, on the other hand, the pointer 41 has passed below 0, the wire 99 is made stiffer by screwing the screw 98 further into the bar 97.

The two tubes 32 and 33 are now joined, the mounting plate 5 is supported on the posts 6 by screws 8 and the connection to tube 32 and 33 is soldered into the hole 31. The factory adjustment is now complete.

It should be noted that it is unnecessary to calibrate the diaphragm 15 in any manner whatsoever. These may vary in strength or rate of expansion in different gauges of any given lot. Likewise, the stiffness of the spring in various switches 55, 56 may vary.

When the consumer receives his gauge, he turns on the pressure slowly and lets the pointer rise from 0 to the value at which he wishes the upper limit alarm. Let us suppose this is 55 lbs. The screw 72 was screwed outward before the gauge was shipped from the factory. When the pointer 41 indicates 55 lbs., the user enters a screwdriver in an opening in the outer casing and slowly screws the screws 72 inward, which causes the entire switch 55 to swing about the stud 60 compressing the spring 66. This will also bring the arm 80 more tightly against the finger 51. This turning of screw 72 is continued until the pressure of the arm 80 against switch pin 57 snaps the switch and gives the alarm.

The user now drops the pressure slowly, which causes the high pressure alarm to cease, to the point at which he wishes the low pressure alarm to signal. Let us assume this point to be 40 lbs. When shipped from the factory the screw 72 was screwed far in. The user turns the screw 72 outward, and this allows the spring 66 to expand, turning the switch 56 clockwise about the stud 60.

I claim:

1. In a pressure gauge having a pointer designed to move over a wide increment on a scale for a unit pressure change between specified pressure limits and over a narrower increment of the scale for the same unit pressure change outside of those limits, in combination, a device which distorts in proportion to the fluid pressure applied to it, a support for this device, a pointer movably carried on said support, mechanism connected to a movable portion of said device adapted to move the pointer a wide increment for a unit pressure change on the device, a rod pivoted on the support and connected to the movable portion of the device to move freely therewith, abutments on the support one of which is engaged by the rod when the pressure reaches one of the specified limits so that further movement of the rod causes the rod to act as a cantilever whereby resistance to distortion of the device carried by the support is increased in such manner that it causes the pointer to move a smaller increment beyond those pressure limits for the same pressure change, and means for changing the length of the cantilever portion of the rod.

2. In a pressure gauge having a pointer designed to move over a wide increment on a scale for a unit pressure change between specified pressure limits and over a narrower increment of the scale for the same unit pressure change outside of those limits, in combination, a device which distorts in proportion to the fluid pressure applied to it, a support for this device, a pointer movably carried on said support, mechanism connected to a movable portion of said device adapted to move the pointer a wide increment for a unit pressure change on the device, a bar pivoted on the support, a rod carried by the bar and connected to the movable portion of the device to move freely therewith, adjustable abutments on the support one of which is engaged by the bar when the pressure reaches one of the specified units so that the bar cannot move further and further movement of the rod causes it to act as a cantilever whereby resistance to distortion of the device carried by the support is increased in such manner that it causes the pointer to move its smaller increment beyond those pressure limits for the same pressure changes.

3. In a pressure gauge having a pointer designed to move over a wide increment on a scale for a unit pressure change between specified pressure limits and over a narrower increment of the scale for the same unit pressure change outside of those limits, in combination, a device which distorts in proportion to the fluid pressure applied to it, a support for this device, a pointer movably carried on said support, mechanism connected to a movable portion of said device adapted to move the pointer a wide increment for a unit pressure change on the device, a bar pivoted on the support, a rod axially mounted in a stud adjustably carried by the bar and connected to the movable portion of the device to move freely therewith, adjustable abutments on the support one of which is engaged by the bar when the pressure reaches one of the specified units so that the bar cannot move further and further movement of the rod causes it to act as a cantilever whereby resistance to distortion of the device carried by the support is increased in such manner that it causes the pointer to move its smaller increment beyond those pressure limits for the same pressure changes and the decrease in the increment may also be adjusted.

4. A device for securing an adjustably smaller movement of the pointer on the scale of a gauge for a given change in the quantity being measured after a given point on the scale has been reached, comprising, a straight cantilever spring whose side is adapted to engage a moving part of a gauge when the pointer reaches the given point on the scale, a relatively rigid piece supporting said cantilever spring in firm axial alignment therewith, a pivoted piece supporting said rigid piece, means for adjustably moving said rigid piece on the pivoted piece to vary the portion of said cantilever spring extending from the rigid piece to the moving part of the gauge, an adjustable stop engaged by said pivoted piece when the pointer is at the given point on the scale.

5. A pressure gauge adapted to give an adjustably smaller movement of the pointer on the scale for a given change in the pressure being measured after a given point on the scale has been reached, comprising, a pressure responsive device, a scale, a pointer moving over said scale to indicate pressure, means for actuating said pointer in response to pressure changes, a straight cantilever spring wire whose side is adapted to engage a moving part of the gauge when the pointer reaches the given point on the scale, a screw drilled axially to support said cantilever wire, a pivoted piece in which said screw is axially adjustable to vary the portion of said cantilever spring extending from the rigid piece to the moving part of the gauge, an adjustable stop engaged by said pivoted piece when the pointer is at the given point on the scale.

6. A pressure gauge adapted to give an adjustably smaller movement of the pointer on the scale for a given change in the pressure being measured after a given point on the scale has been reached, comprising, a housing, a chassis supported in said housing carrying all movable parts, a pressure responsive device supported on said chassis, a scale, a pointer passing over said scale, means carried by said chassis for actuating said pointer in response to pressure changes, a cantilever spring wire whose side is adapted to engage a moving part of a gauge when the pointer reaches the given point, a screw drilled axially to support said cantilever wire, a pivoted piece supported by said chassis in which said screw is axially adjustable to vary the portion of said cantilever spring extending from the rigid piece to the moving part of the gauge, an adjustable stop carried by said chassis and engaged by said pivoted piece when said pointer is at the given point on the scale.

7. A pressure gauge adapted to give an adjustably smaller movement of the pointer on the scale for a given change in the pressure being measured after a given point on the scale has been reached, comprising, a housing, a chassis comprising a plate with one side bent at right angles supported in said housing, a pressure responsive diaphragm supported on said side of the plate so that the axis of the diaphragm is close to the plane of the plate, a scale, a pointer passing over said scale, means carried by said chassis for actuating said pointer in response to pressure changes in said diaphragm, a cantilever spring wire whose side is adapted to engage a moving part of a gauge when said pointer reaches the given point, a screw drilled axially to support said cantilever wire, a pivoted piece supported by said chassis in which said screw is axially adjustable to vary the portion of said cantilever spring extending from the rigid piece to the moving part of the gauge, an adjustable screw carried by said chassis and engaged by said pivoted piece when the pointer is at the given point on the scale, both of said screws being adjustable without removing any of the parts from the chassis.

8. A retarding mechanism adapted to reduce the increment the pointer of a gauge moves in response to a unit pressure change which falls outside of a given pressure range, comprising, a pivoted spring-carrier, a cantilever spring supported by the carrier and projecting into the path of a movable part of the gauge, an adjustable stop engaged by the carrier which has been moved against it by the cantilever spring which is moved by the movable part of the gauge when the pressure reaches the limits of the given pressure range.

9. A retarding mechanism adapted to reduce the increment the pointer of a gauge moves in response to a unit pressure change which falls outside of a given pressure range, comprising, a pivoted spring-carrier, a cantilever spring supported at one end by the carrier and whose other end moves with a movable part of the gauge, an adjustable stop engaged by the carrier which has been moved against it by the cantilever spring which is moved by the movable part of the gauge when the pressure reaches the upper limits of the given pressure range, a second adjustable stop engaged by the carrier which has been moved against it by the cantilever spring when the pressure reaches the lower limits of the given pressure range.

References Cited in the file of this patent

UNITED STATES PATENTS

| Number | Name | Date |
|---|---|---|
| 879,039 | Dixon | Feb. 11, 1908 |
| 908,300 | Melvin | Dec. 29, 1908 |
| 1,344,340 | Fulton | June 22, 1920 |
| 1,414,165 | Aschenbagh | Apr. 25, 1922 |
| 1,649,112 | Harrison | Nov. 15, 1927 |
| 1,696,814 | Rosenburgh | Dec. 25, 1928 |
| 2,291,501 | Persons | July 28, 1942 |
| 2,357,877 | Crew | Sept. 12, 1944 |
| 2,357,878 | Crew | Sept. 12, 1944 |

FOREIGN PATENTS

| Number | Country | Date |
|---|---|---|
| 535,542 | Great Britain | Apr. 11, 1941 |